(12) United States Patent
Zhuo et al.

(10) Patent No.: US 6,619,669 B2
(45) Date of Patent: Sep. 16, 2003

(54) FLEXIBLE NON-METALLIC SEALS MADE OF NON-WOVEN FABRIC

(75) Inventors: Zhangqing Zhuo, Clifton Park, NY (US); Wei Tong, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/901,570

(22) Filed: Jul. 11, 2001

(65) Prior Publication Data

US 2003/0011145 A1 Jan. 16, 2003

(51) Int. Cl.⁷ .................................................. F16J 15/08
(52) U.S. Cl. ....................................................... 277/654
(58) Field of Search ................................. 277/644, 645, 277/650, 654, 906, 355

(56) References Cited

U.S. PATENT DOCUMENTS

| | | | |
|---|---|---|---|
| 1,457,763 A | * | 6/1923 | Adams |
| 1,582,562 A | * | 4/1926 | Vogel |
| 1,601,381 A | * | 9/1926 | Thompson |
| 1,946,475 A | * | 2/1934 | Barker |
| 3,275,331 A | * | 9/1966 | Mastrobattista et al. .... 277/309 |
| 3,938,813 A | * | 2/1976 | Forch .......................... 277/569 |
| 4,618,152 A | * | 10/1986 | Campbell |
| 4,955,218 A | * | 9/1990 | Brandener ................... 72/146 |
| 5,161,806 A | * | 11/1992 | Balsells |
| 5,286,574 A | * | 2/1994 | Foster |
| 5,438,906 A | * | 8/1995 | Huber |
| 5,549,968 A | * | 8/1996 | Byers et al. .................. 442/70 |
| 6,254,106 B1 | * | 7/2001 | Denker et al. |

FOREIGN PATENT DOCUMENTS

| | | | |
|---|---|---|---|
| DE | 32 23 676 A1 | * | 1/1984 |
| EP | 0 903 518 A2 | | 3/1999 |
| JP | 3-213337 | * | 9/1991 |

* cited by examiner

Primary Examiner—William L Miller
(74) Attorney, Agent, or Firm—Nixon & Vanderhye

(57) ABSTRACT

A seal as a non-woven fabric folded along lines transverse to the opposite side of the seal and secured by adhesive to fabric strips. The non-woven fabric forms elongated cells. By securing one of these strips to a stationary component of the sealing surfaces, the opposite strip may expand or collapse relative to a movable sealing surface to accommodate excursions of that surface. Multiple layers of cells may be provided in the seals. Additionally, to increase seal stiffness, inserts may be extended into one or more of the cells.

20 Claims, 4 Drawing Sheets

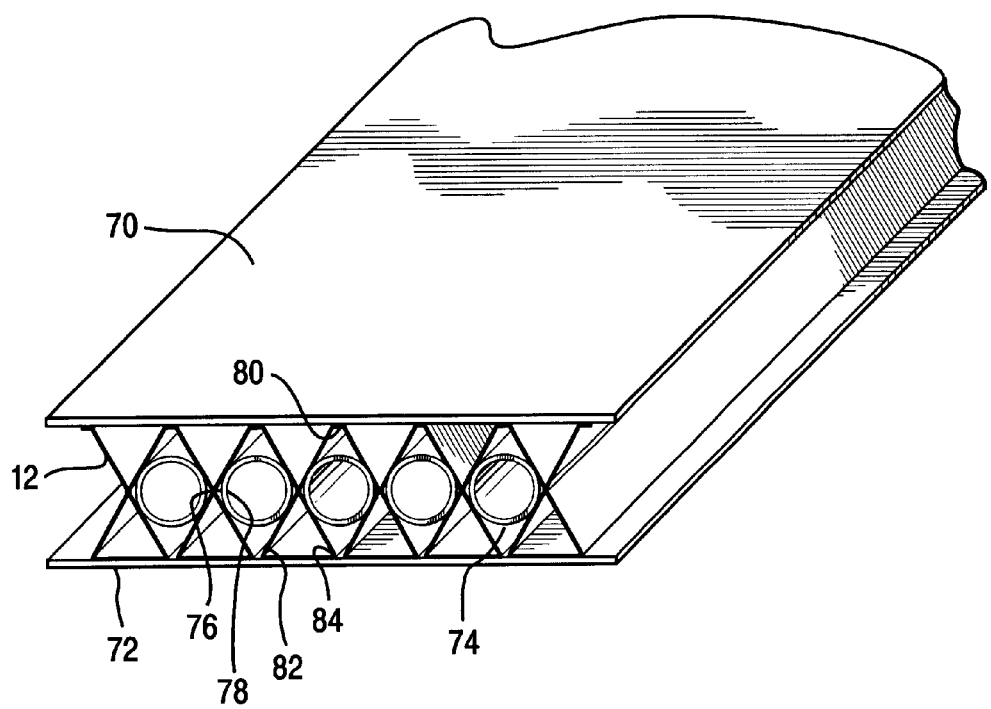
*Fig. 7*
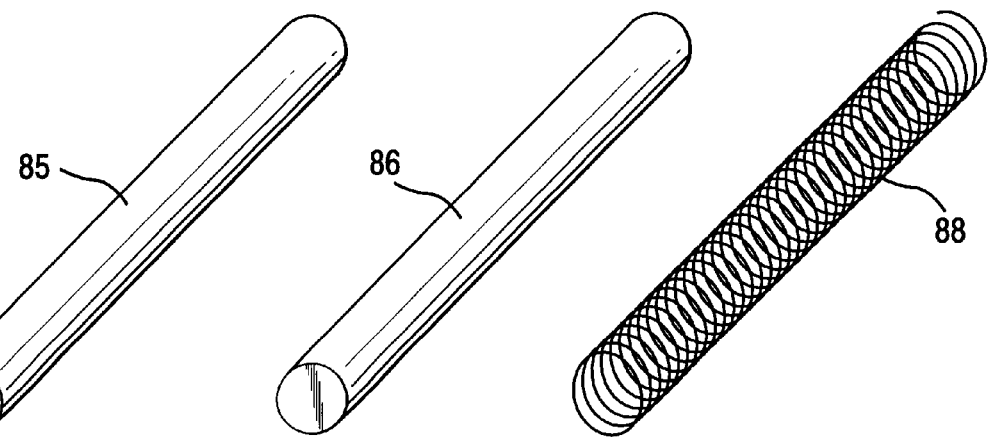
*Fig. 8*   *Fig. 9*   *Fig. 10*

FLEXIBLE NON-METALLIC SEALS MADE OF NON-WOVEN FABRIC

BACKGROUND OF THE INVENTION

The present invention relates generally to seals and particularly to fabric seals for usage in low leakage static or dynamic sealing applications where pressure differentials and operating temperatures are moderate.

The increased worldwide demand for electricity leads to the necessity of designing large-scale, high-powered, high-efficiency, and low cost power generation turbomachines with high standards for reliability and performance. One of the primary concerns in a turbomachine design is its sealing performance because it has direct impact on machine operating reliability and efficiency. A number of seals are used in turbomachines such as gas/steam turbines, compressors, and generators for minimizing leakage flows. According to the movement of a seal relative to its sealing surface, seals can be classified as stationary seals affording leakage barriers around and between stationary components or rotating seals affording leakage barriers between stationary and rotating components. Over the years, various techniques have been developed to improve both stationary and rotating seals. Much of this development has occurred in the turbine industry where parasitic flow control is critical.

As a circumferential contacting seal, brush seals have been widely used in turbomachines due to their distinguishing characteristics, i.e., lower leakage flow rate compared with labyrinth seals and seal flexibility for accommodating excursions at the interface without excessive wear and loss of sealing capability. However, brush seals formed of brush bristles are usually expensive and have exhibited hysterisis and were difficult to manufacture. The crucial seal parameters such as cant angle and bristle height depend on the process capability or manufacturing technique and are very difficult to control. A conventional brush seal is made by either folding bristles over a metal plate or sandwiching bristles between a pair of ring-shaped metal support plates and welding ends of the bristles and plates to one another adjacent common edges thereof. Since the metal bristle holder is usually machined with a tight tolerance, a brush seal can fit only a specific sealing dimension. This can result in very high costs for brush seals in tooling, manufacturing, and installation and leads to a long cycle time in brush seal fabrication.

BRIEF SUMMARY OF THE INVENTION

According to a preferred embodiment of the present invention, there is provided a flexible seal formed of a non-woven fabric disposed between a pair of strips, preferably also formed of a fabric material. Preferably, a continuous non-woven fabric layer is folded onto itself and is secured, for example, by adhesive along the fold lines to itself or to the strips to form a plurality of cells extending longitudinally between opposite sides of the seal. Consequently, the cells lie between the pair of fabric strips and the seal responds substantially freely to forces acting on the seal. That is, generally rectilinear cells which are collapsible and expandable in a direction between the two sealing surfaces are provided, the cells having dimensions varying from hundreds of micrometers to several centimeters.

In a particular application of the present invention, one of the strips may, for example, be adhered by adhesive to a stationary component, i.e., a stator surface. The other strip is located adjacent the rotating surface. Because the non-woven fabric forming the cells lies between the strips, the seal responds substantially freely to applied forces. Thus, any radial excursion of the rotating surface is accommodated by the collapsing and expansion of the cells of the seal. The strip in contact with the rotating surface may have a wear-resistance material applied to its surface. For example, a coating of Teflon or a near frictionless carbon coating can be applied to that strip.

As will be appreciated, the seals can be formed of one or more layers of cells and hence the thickness of the seal can be varied depending upon the sealing application. For example, for certain applications, the fabric layers may be formed of a mixture of metallic and non-metallic fibers enabling the seal for use in intermediate to high pressure applications. Various other design parameters may be altered depending upon the application such as fabric construction, material, fabric layer thickness, cell construction and dimensions. One particular advantage of the present seal is that in contrast to brush seals having bristles which are laid at certain angles to the shaft surface to facilitate seal flexibility and avoid excessive fiber stress during shaft excursion, the present seal is independent of the direction of rotation of the shaft. The risk of seal damage due to reverse rotation is thus eliminated. Secondly, seal flexibility is adjustable. For example, seal flexibility may be increased by increasing the cell size and/or the number of cell layers, as compared with a less flexible seal with decreased cell size and/or cell layers. To create stiffness in the seal, the seal can be constructed with a half cell layer or a one cell layer. For applications which require high seal stiffness, inserts may be placed in the seal cells. Such inserts may take numerous forms, for example, thin walled pipes formed of rubber or plastic, such as aerated plastic sticks or helical wire coils.

A third immediate advantage of the present seal is that it provides solutions for applications having large sealing dimensions and/or irregular sealing geometry. Conventional seals require machining brush holders precisely with tight tolerances. As a result, each seal can serve only a specific sealing dimension. As a sealing dimension becomes large, it becomes very difficult to make the seal. The present seal can readily and easily fit different sealing dimensions and complex sealing geometry.

In a preferred embodiment according to the present invention, there is provided a seal between first and second spaced components comprising generally parallel fabric layers spaced from one another with a first layer thereof for securement to the first component and a second layer thereof disposed adjacent the second component and a non-woven fabric secured to and between the first and second layers, the non-woven fabric defining a plurality of cells between the first and second layers extending in a direction generally parallel to the layers and perpendicular to opposite sides of the seal, the non-woven fabric biasing the second layer in a direction towards the second component.

In a further preferred embodiment according to the present invention, there is provided in an apparatus including a stationary component and a rotatable component about an axis, a seal between the components including a first layer of fabric secured to the stationary component and a second layer of fabric spaced from the first fabric layer and about the rotatable component, a non-woven fabric between and secured to the layers, the non-woven fabric defining a plurality of multi-sided generally annular cells extending between the layers about the axis and in planes generally normal to the axis.

BRIEF DESCRIPTION OF THE DRAWINGS

FIG. 7 is a view similar to FIG. 1 illustrating a further embodiment of the present invention affording a seal having increased stiffness; and FIGS. 8–10 are perspective views of inserts for use with the seal illustrated in FIG. 7.

DETAILED DESCRIPTION OF THE INVENTION

Figure 1:
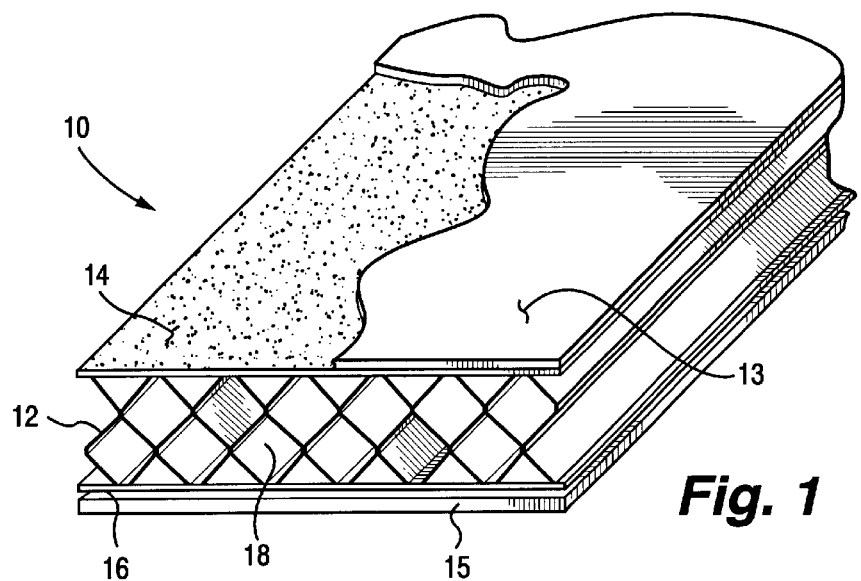
FIG. 1 is a perspective view of a non-woven fabric seal construction in accordance with a preferred embodiment of the present invention.
Figure 2:
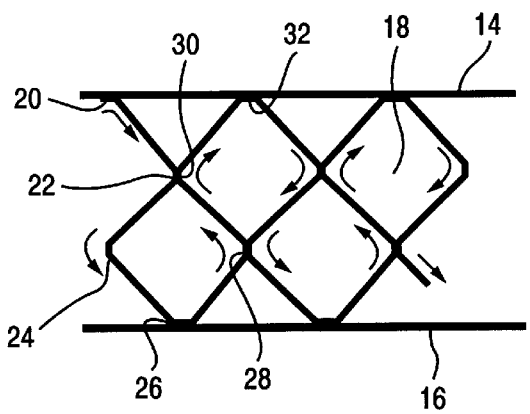
FIG. 2 is an enlarged fragmentary cross-sectional view of the seal of FIG. 1.
Figure 3:
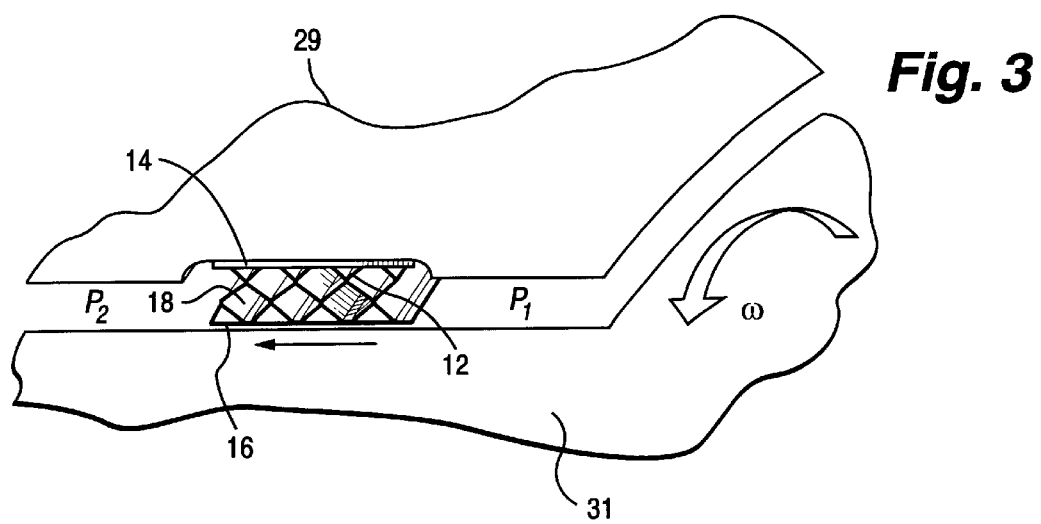
FIG. 3 is a perspective view of a non-woven fabric seal of the present invention located between stationary and rotary components.

Referring now to the drawings, particularly to FIGS. 1 and 2, there is illustrated a seal constructed in accordance with the preferred embodiment of the present invention and generally designated 10. The seal 10 includes a seal body 12 formed of a non-woven fabric material sandwiched between a pair of strips 14 and 16. The seal is for disposition between a pair of components, e.g., first and second stationary components 13 and 15, i.e., a stationary seal, or a stationary component and a rotatable component, i.e., a dynamic seal (see FIG. 3). In FIG. 1, the strips 14 and 16 are preferably formed of a non-woven fabric material and form a stationary seal. Thus, strips 14 and 16 may be secured to the stationary components 13 and 15, respectively, for example by use of an adhesive. In the case of a dynamic seal as illustrated in FIG. 3, strip 14 may be secured to a stationary part 29 and strip 16 may lie closely adjacent to or in engagement with a rotary component 31. The seal 10 thus seals between the two components.

Preferably, the fabric body 12 is formed of a single continuous non-woven fabric folded at spaced locations relative to one another and adhered at the fold lines, e.g., by an adhesive, to form a multiplicity of cells 18. For example, and referring to FIG. 2, the non-woven fabric 12 may be secured along an edge 20, for example, by an adhesive to the fabric 14 and have alternating folds 22 and 24 between strips 14 and 16 until the strip is folded along fold line 26 and adhered to strip 16. The continuous non-woven fabric layer 12 may then reverse direction and extends to strip 14. Layer 12 thus has alternating folds forming fold lines 28 and 30 until it is secured, preferably by adhesive, to the first fabric 14 along a fold line 32. The non-woven fabric 12 continues from one side of the seal, i.e., one pressure region, to the opposite side of the seal, i.e., the other pressure region, with similar alternate folds between the material strips 14 and 16 forming the cells 18. The fold lines of fabric 12 intermediate strips 14 and 16 are adhered, e.g., by adhesive, to one another. For example, fold lines 22 and 30 are adhered to one another. Thus, the cells and fold line extend longitudinally about the seal in and on opposite sides of the seal. That is, the cells 18 extend longitudinally about the seal and together with the fabric 12, lie between high and low pressure regions on opposite sides of the seal. Seal 10 can be formed in a flat configuration or may be irregular in shape or circular, for example, as illustrated in FIG. 3.

In FIG. 3, a seal similar to the seal disclosed in FIGS. 1 and 2 is disposed between a stationary component and a rotating component. The multi-cell seal formed by the non-woven fabric 12 is adhered as in the prior embodiment to strips of preferably non-woven fabric material 14 and 16. The fabric material 14 is adhered to a stationary component 29, for example by an adhesive. The fabric material 16 lies directly adjacent and is engagable with the rotating surface of the rotating component 31. It will be appreciated that the seal 12 in FIG. 3 may expand or collapse in response to rotary excursions of the rotatable component while maintaining the integrity of the seal.

Figure 4:
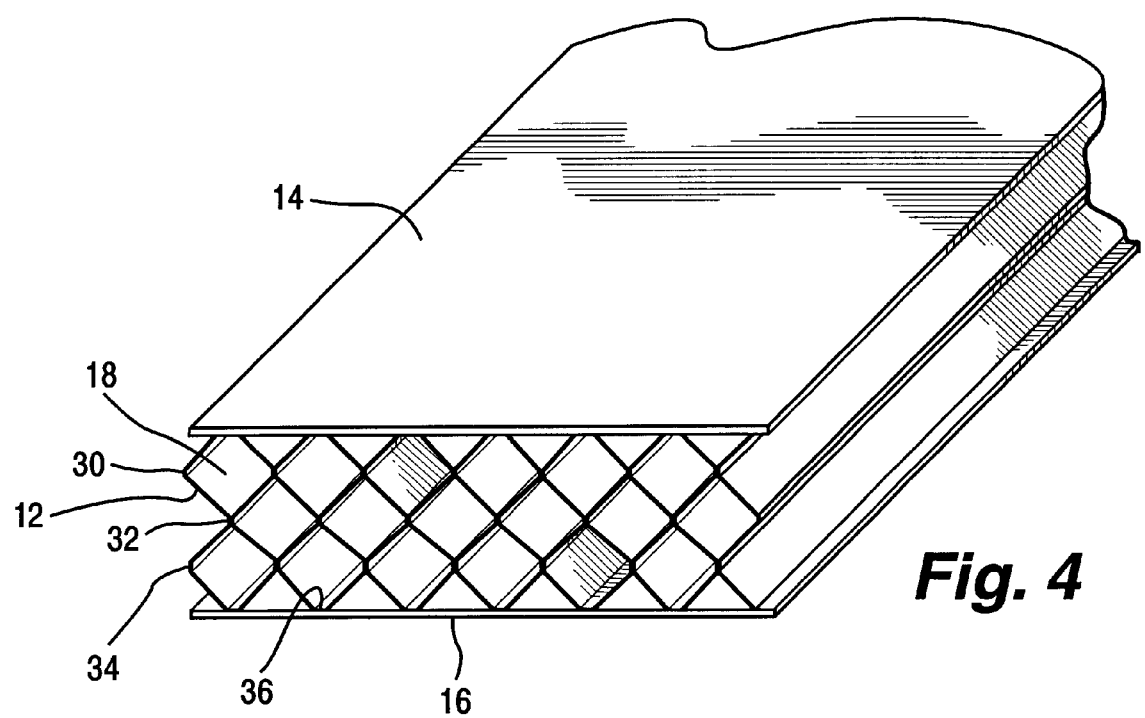
FIG. 4 is a view similar to FIG. 1 illustrating a further embodiment of the present invention.
Figure 5:
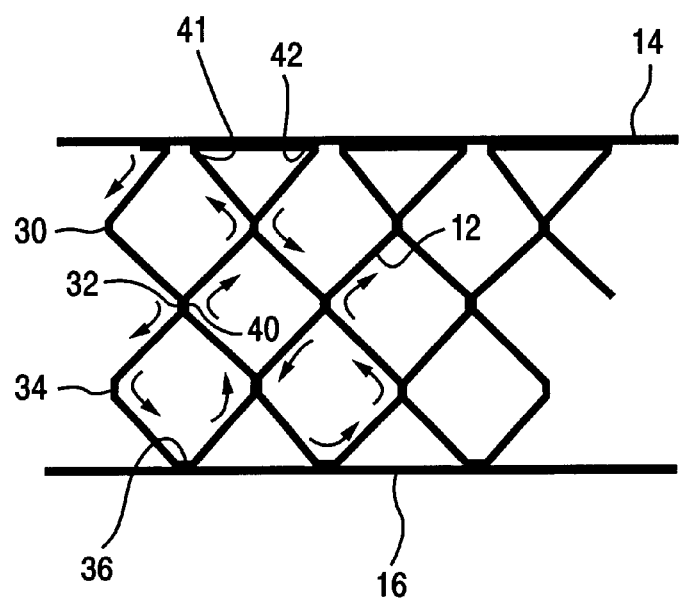
FIG. 5 is a view similar to FIG. 2 illustrating a manner of formation of the seal of FIG. 4.

In FIGS. 4 and 5, additional layers of cells for the seal are provided. That is, instead of the two layers of cells 18 illustrated in the seals of FIGS. 1–3, the seal illustrated in FIGS. 4 and 5 has three cell layers. The manner of fabrication of the seal is similar to that discussed above with respect to the seal of FIGS. 1 and 2. That is, a continuous non-woven fabric 12 is adhered to the strip 14 and extends at an angle to a first fold line 30 and then to a second fold line 32 where the material is reversely folded, and then to a third fold line 34 where a further reverse fold is provided. Each reverse fold is 900. The non-woven fabric material then extends from fold 34 to the fabric 16 where it is folded again at 36, secured to fabric 16, e.g., by adhesive, and returned to the fabric 14 alternately being reversely folded. A reverse fold 40 is adhered to the fold 32, for example by an adhesive. The reverse fold 41, however, is folded through 1350 to form an angle of about 450 with fabric 14. The material reverse folded at 41 extends along the inside surface of fabric 14 along a diagonal of the otherwise rectilinear cell 18. The non-woven fabric then, again folds along a fold line 42 through a reverse 1350 angle and the folds repeat with the folds being secured to previously folded fold lines, for example, by adhesive. As in the prior embodiment, the fabric 12 is alternately reversely folded between strips 14 and 16 from one side of the seal to the opposite side, sealing the pressure regions on opposite sides of the seal from one another. fabric material then extends from fold 34 to the fabric 16 where it is folded again at 36, secured to fabric 16, e.g., by adhesive, and returned to the fabric 14 alternately being reversely folded. A reverse fold 40 is adhered to the fold 32, for example by an adhesive. The reverse fold 40, however, is folded through 135° to form an angle of about 45° with fabric 14. The material reverse folded at 40 extends along the inside surface of fabric 14 along a diagonal of the otherwise rectilinear cell 18. The non-woven fabric then, again folds along a fold line 42 through a reverse 135° angle and the folds repeat with the folds being secured to previously folded fold lines, for example, by adhesive. As in the prior embodiment, the fabric 12 is alternately reversely folded between strips 14 and 16 from one side of the seal to the opposite side, sealing the pressure regions on opposite sides of the seal from one another.

Figure 6:
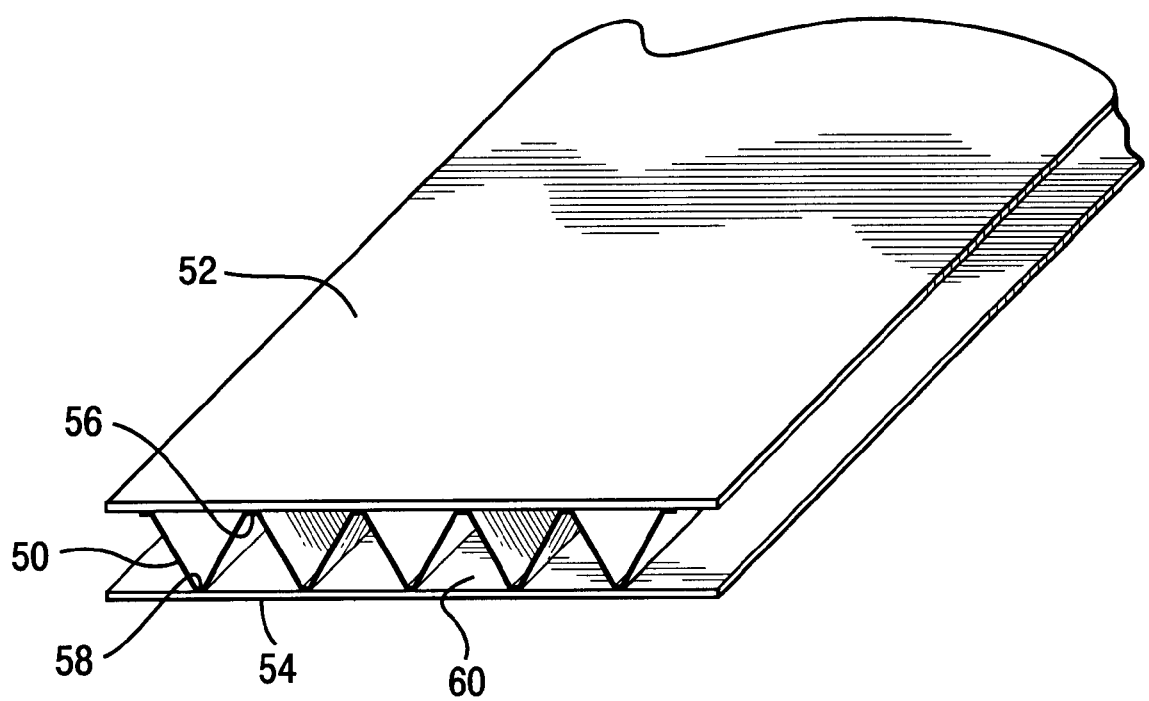
FIG. 6 is a view similar to FIG. 1 illustrating a further embodiment of the present invention.

Referring now to FIG. 6 which illustrates a further embodiment of the present invention, the seal has significantly higher seal stiffness and less seal flexibility then the seals disclosed in the prior embodiment. In this form, the non-woven fabric 50 disposed between the fabric strips 52 and 54 is folded and secured to the strips along each fold line 56 and 58 thereby defining generally triangularly shaped elongated cells 60. The fold lines are preferably secured by an adhesive to the fabric strips. The resultant seal may be employed for similar gaps as in the prior embodiment but has a higher seal stiffness and less flexibility.

Referring now to FIGS. 7–10, for those seal applications requiring a high degree of stiffness, one or more inserts may be disposed in the cells defined by the non-woven fabric. In FIG. 7, the non-woven fabric 12 extends between non-woven strips 70 and 72 similarly as in the previous embodiment of FIG. 5 but forms only a single row of rectilinear cells 74 between strips 70 and 72. The intermediate fold lines 76 and 78 are adhered to one another while the fold line 80 is adhered to strip 70 and folds lines 82 and 84 to strip 72. The generally rectilinear shaped cells 74 formed may receive circular elements, e.g., a rod or tube, to add stiffness to the seal. For example, in FIG. 8, a plastic pipe 85 having a thin wall thickness may be disposed in one or more of the cells 74. Alternatively, as illustrated in FIG. 9, a flexible rubber or aerated plastic rod 86 may be disposed in one or more of the cells 74. An additional form of insert is illustrated in FIG. 10 comprising a helical wire coil 88 which likewise may be disposed in the cells. The inserts significantly increase the stiffness of the seal while reducing seal flexibility and therefore afford a seal of this type useful for sealing between higher pressure differentials.

It will be appreciated that the cellular form of the intermediate fabric provides a bias toward the strips, i.e., the fabric tends to separate the strips one from the other. To enhance that bias, the fabric may be formed of a combination of metallic fibers and non-metallic fibers, the proportions being dependent upon the application of the seal.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A seal between first and second spaced components comprising:

generally parallel fabric layers spaced from one another with a first layer thereof for securement to the first component and a second layer thereof disposed adjacent the second component; and a non-woven fabric secured to and between said first and second layers, said non-woven fabric defining a plurality of cells between said first and second layers having a major length dimension extending in a direction generally parallel to said layers of the seal, said non-woven fabric biasing said second layer in a direction towards said second component.

2. A seal according to claim 1, wherein said non-woven fabric extends continuously from one side of the seal to an opposite side of the seal with the cells being spaced from one another.

3. A seal according to claim 1, wherein said non-woven fabric forms elongated cells having elongated multiple sides between said layers.

4. A seal according to claim 3, wherein said non-woven fabric extends continuously from one side of the seal to an opposite side of the seal and is secured to itself at spaced locations along said cells and to said layers to define said cells.

5. A seal according to claim 3, wherein said non-woven fabric is formed in part of metal fibers.

6. A seal according to claim 3 wherein said non-woven fabric extends continuously back and forth between said first and second layers of the seal and is secured to itself at spaced locations along said cells and at locations spaced between said first and second layers.

7. A seal according to claim 6 wherein said non-woven fabric is folded along fold lines extending parallel to said first and second layers and at locations between and spaced from said layers, said non-woven fabric being secured to itself along adjoining fold lines spaced form and between said first and second layers and extending generally parallel to said first and second layer.

8. A seal according to claim 1, including a flexible insert extending within at least one of said cells to provide stiffness to the seal.

9. A seal according to claim 8, wherein said insert includes a hollow thin walled plastic tube.

10. A seal according to claim 8, wherein said insert comprises a wire coil.

11. In an apparatus including a stationary component and a rotatable component about an axis, a seal between said components including a first layer of fabric secured to said stationary component and a second layer of fabric spaced from said first fabric layer and about said rotatable component, a non-woven fabric between and secured to said layers, said non-woven fabric defining a plurality of multi-sided generally annular cells extending between said layers about said axis and in planes generally normal to said axis, said cells extending generally concentrically about the axis and relative to said first and second layers.

12. A seal according to claim 11, wherein said cells have elongated multiple sides.

13. A seal according to claim 12, wherein said cells are formed of a continuous strip of non-woven fabric extending from one side of the seal to an opposite side of the seal and is secured to itself at spaced locations along said cells and said layers to define said cells.

14. A seal according to claim 11, wherein said non-woven fabric is formed in part of metal fibers.

15. A seal according to claim 11, including a flexible insert extending within at least one of said cells to provide stiffness to the seal.

16. A seal according to claim 15, wherein said insert includes a hollow thin walled plastic tube.

17. A seal according to claim 15, wherein said insert comprises a wire coil.

18. A seal according to claim 11, wherein said cells have elongated multiple sides, wherein said cells are formed of a continuous strip of non-woven fabric extending from one side of the seal to an opposite side of the seal and is secured to itself at spaced locations along said cells and said layers to define said cells, said continuous strip of non-woven fabric is adhesively secured to itself at spaced locations therealong.

19. A seal according to claim 11, wherein said non-woven fabric extends continuously back and forth between said first and second layers of the seal and is secured to itself at spaced locations along said cells and at locations spaced between said first and second layers.

20. A seal according to claim 11, wherein said non-woven fabric is folded along fold lines generally concentric to said first and second layers and at locations between and spaced from said first and second layers, said non-woven layer being secured to itself along adjoining fold lines spaced from and between said first and second layers and extending generally concentric to said first and second layers.

* * * * *

UNITED STATES PATENT AND TRADEMARK OFFICE
CERTIFICATE OF CORRECTION

PATENT NO.   : 6,619,669 B2
DATED        : September 16, 2003
INVENTOR(S)  : Zhuo et al.

It is certified that error appears in the above-identified patent and that said Letters Patent is hereby corrected as shown below:

Column 4,
Lines 11-52, delete the paragraph in its entirety and substitute the following paragraph:

-- In Figures 4 and 5, additional layers of cells for the seal are provided. That is, instead of the two layers of cells 18 illustrated in the seals of Figures 1-3, the seal illustrated in Figures 4 and 5 has three cell layers. The manner of fabrication of the seal is similar to that discussed above with respect to the seal of Figures 1 and 2. That is, a continuous non-woven fabric 12 is adhered to the strip 14 and extends at an angle to a first fold line 30 and then to a second fold line 32 where the material is reversely folded, and then to a third fold line 34 where a further reverse fold is provided. Each reverse fold is 90º. The non-woven fabric material then extends from fold 34 to the fabric 16 where it is folded again at 36, secured to fabric 16, e.g., by adhesive, and returned to the fabric 14 alternately being reversely folded. A reverse fold 40 is adhered to the fold 32, for example by an adhesive. The reverse fold 41, however, is folded through 135º to form an angle of about 45º with fabric 14. The material reverse folded at 41 extends along the inside surface of fabric 14 along a diagonal of the otherwise rectilinear cell 18. The non-woven fabric then, again folds along a fold line 42 through a reverse 135º angle and the folds repeat with the folds being secured to previously folded fold lines, for example, by adhesive. As in the prior embodiment, the fabric 12 is alternately reversely folded between strips 14 and 16 from one side of the seal to the opposite side, sealing the pressure regions on opposite sides of the seal from one another.

Column 6,
Line 5, kindly delete "spaced form" and insert -- spaced from -- therefor.
Line 7, kindly delete "layer." and insert -- layers. -- therefor.

Signed and Sealed this

Sixteenth Day of December, 2003

JAMES E. ROGAN
*Director of the United States Patent and Trademark Office*